Figure 1:
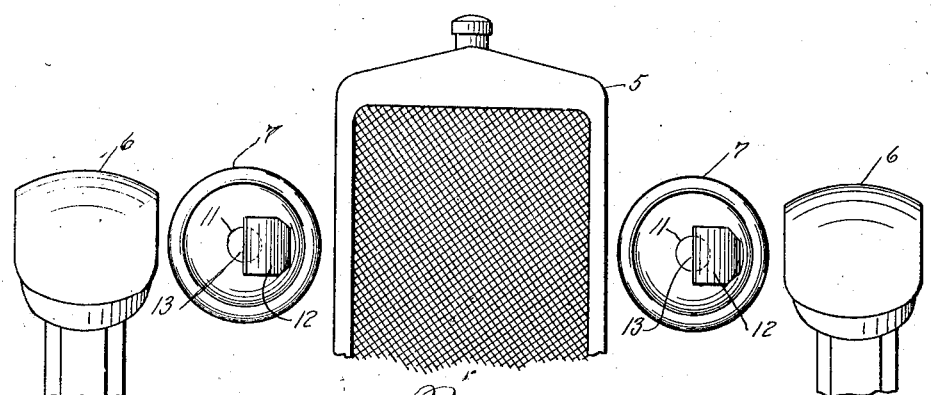

June 26, 1928.

C. D. TURNER 1,675,236

ROAD ILLUMINATION

Filed April 29, 1927

Witness
John B. Dade.

Inventor
Clark D. Turner
by Wilkinson & Ginsta
his Attorneys

Patented June 26, 1928.

1,675,236

UNITED STATES PATENT OFFICE.

CLARK D. TURNER, OF FORT MORGAN, COLORADO, ASSIGNOR TO TURNER MANUFACTURING CO., OF DENVER, COLORADO, A CORPORATION OF COLORADO.

ROAD ILLUMINATION.

Application filed April 29, 1927. Serial No. 187,604.

This invention relates to road illumination, and particularly embodies certain novel equipment for vehicle headlights, of the projector type, functioning in the manner or for the purposes hereinafter appearing.

When driving an automotive vehicle and in passing a brilliant light projected from the opposite direction, such for instance as from the headlights of an approaching vehicle or a stationary one for that matter, there becomes for you a temporary period of darkness just before and while you are passing said other light and momentarily thereafter, an absolute wall of darkness in the road ahead of you as it were, and so much so in fact that you cannot distinguish during that period even the vehicle you are passing, nor anything at all in the road ahead, even on your own side of the road, until after you have passed that other light, because the rays from the headlights of your own vehicle do not seem to penetrate, and certainly do not dissipate said appearing wall of darkness.

I am not prepared at this time to positively state the exact reasons for this. It may be because you are passing from a highly illuminated zone into a darkened one, when your eyes would have to become accustomed to the changed condition before seeing all objects clearly, or it may be that the rays from the bright lights of the other car quash or blanket, as it were, the rays from the lights of your own car, but at any event that heretofore impenetrable wall of darkness temporarily arises in the road ahead of you, with a fog-like opaqueness, and is not only a source of extreme annoyance but is also a cause of great danger which not infrequently results in serious accidents, especially when driving at relatively high speed along a sparsely lighted road or highway.

Accordingly, an important object of my invention has been to devise simple, economical and facilely attachable and detachable means, applied in association with a vehicle projector light, that will effectively and at all times maintain the road ahead as substantially illuminated, for eliminating the said temporarily darkened period when closely approaching and passing an oppositely projected bright light, whereby a driver of an automobile may at all times be able to clearly distinguish any object in the road ahead, whether it be a person, an animal, a vehicle, or any obstruction, in the avoidance of accidents otherwise of likely occurrence, and this whether or not the lights of an approaching vehicle are equipped with the present improvements. In a measure, therefore, it may be said that the protection is primarily designed for the driver and occupants of the vehicle equipped with the improvements, as well as to prevent damage to that vehicle itself, but, as incidental thereto, proportionate protection inures all around.

A further object has been to provide such means, as aforesaid, that will additionally function to relieve the glare from the headlights, of the vehicle itself, equipped with the improvements, which are commonly known as dimmers or anti-glare devices, and the purposes of which are well understood.

Figure 2:
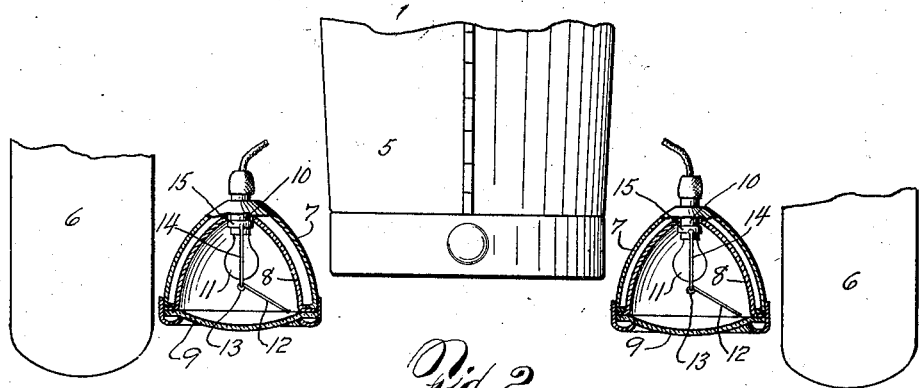
Figure 3:
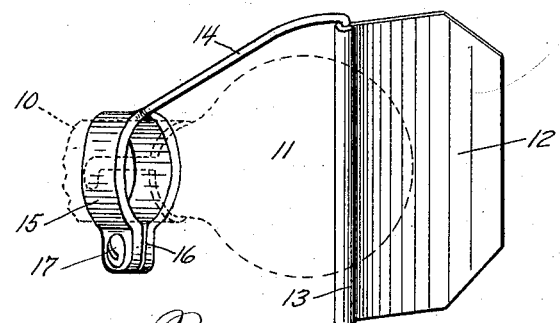

The foregoing and other objects and advantages, however, will more clearly appear as incidental to the following disclosure, and with these outlining remarks, therefore, reference will now be had to the accompanying drawings, illustrating a practical embodiment of the improvements, in which drawings Figure 1 is a fragmentary front elevational view of an automobile, the headlights of which are equipped with my improvements; Figure 2 is a plan view of the same, but with the headlights in horizontal section to show the improvements in top edge plan as contained therein; and Figure 3 is an enlarged perspective view of a practical form of the improvements as applied to the electric lamp bulb of one of said headlights, the said lamp bulb and its socket being shown in dotted outline.

In the general illustration, the numeral 5 indicates the automobile's engine hood, 6 the forward wheel fenders, 7 the outer casings of the headlights, 8 the usual inner casings or main reflectors of parabola form, and 9 the lenses for the headlights. My improvements, for convenience, preferably may be supported as carried by the electric lamp bulb sockets which are indicated at 10, and 11 indicates the electric lamp bulbs themselves.

In carrying out my invention, I employ an auxiliary element embodying as a unit a combined reflector and electric lamp bulb screen or shielding mask that is suitably mounted within the headlight but in certain definite relation to the electrical lamp bulb therein, that is to say as upstanding or vertically disposed at a position inwardly terminating approximately at the major axis of said lamp bulb and in close proximity to or substantially tangential of the central front face of said lamp bulb, and being so fixedly mounted as to at all times rigidly extend forwardly and laterally, substantially across one side portion only of the headlight or its lens, at an appropriate angle relatively to the major axis of the electric lamp bulb. The said appropriate angle should be between thirty and forty-five degrees, and the said lateral direction of projection should be towards the left of the vehicle, as shown in the drawings, or towards the side of the road to the left of the direction of travel, where, like in the United States, it is the rule for approaching traffic to pass on the left side; but when it is the rule that approaching traffic must pass on the right side, as is the case in some countries, then of course the said direction of lateral projection should be towards the right.

As a matter of actual practice, it might be that the forward face of said combined reflector and bulb screen could be a curving surface, and, as before stated, this element may be supported within the headlight, appropriately positioned as aforesaid, in any suitable way. However, I find that a flat blank or planetary vane is eminently satisfactory both from the viewpoints of functioning and manufacturing, and accordingly I shall now describe such a planetary vane and one simple means for mounting the same, although not the only form of supporting means, but it will be understood that I do not necessarily limit the invention to these precise details.

The numeral 12 designates such a planetary vane embodying a flat blank having both front and rear reflecting surfaces. It may be made of thin metal, such as stamping brass, having its front and rear faces silvered to provide highly polished or mirror-like reflecting surfaces. The outer corners of this vane may preferably be beveled, as shown, for reasons hereinafter appearing. The inner edge portion 13 thereof is shown as fixedly attached to or crimped over a depending portion of a bracket arm 14 that is upwardly and forwardly projected from a split clamping collar 15, adapted to encompass its respective lamp bulb socket member 10, and having the usual spaced ears 16 and binding screw 17 therefor. Obviously, if desired, the bracket arm 14 might be supplemented by an analogous lower bracket arm, for more rigidly supporting the vane 12. Also, it is obvious that, if desired, the clamping collar 15 might be substituted for by equivalent attaching means, such as suitably turned or bent loop-like continuations of the bracket arm.

In applied relation, as fixedly supported by the aforesaid means from a relative one of the lamp socket members 10, or by any other suitable means, and as seen more clearly from Figure 2, it will be observed that the inner edge portion 13 of the vane 12 is vertically positioned in close proximity to or substantially tangential of the central front surface of its electric lamp bulb 11 and with the body portion of the vane extending forwardly and laterally of one side thereof, as directed towards the far side only of the road and as rigidly disposed in a vertical plane, approximately from and at an appropriate aforesaid angle to the major axis of said lamp bulb.

In actual service, positioned as aforesaid, it follows that the vane 12 effectively functions as a dimmer or anti-glare device inasmuch as, from a certain advanced position, the lamp becomes hidden from the vision of a person ahead of the same on the far side of the road, whether in a vehicle or otherwise, the said vane providing an obscuring shield or mask as interposed between said lamp bulb and the eyes of said person.

In addition to said dimming action, however, which in a way may be said to be secondary to my main object, when a vehicle that is equipped with my improvements, conveniently termed the first vehicle, is advancing towards another vehicle having bright lights and approaching from the opposite direction, conveniently termed the second vehicle, the said vanes 12 also function as masks or obscuring shields for the lamp bulbs of said first vehicle relatively to the bright lights of said second vehicle, and intense light rays from the headlights of said second vehicle, striking the front faces of said vanes 12, will be reflected from the said front faces in a forward and lateral direction ahead of said first vehicle, thereby augmenting the illumination of the road ahead of said first vehicle by means of the reflected light rays from the headlights of said second vehicle. Hence, the aforesaid heretofore temporarily darkened period is eliminated and the near side of the road, relatively to and ahead of said first vehicle, is maintained illuminated at all times across to and beyond that edge of the road, somewhat after the fashion of spotlight service but with more expansive illumination, so that all objects and obstructions ahead are at all times clearly discernible in outline, as well as are ruts in the road, embankments, gullies, ditches or other obstructions that might be dangerously located along that side of the road.

The vanes 12 need not necessarily be of dimensions as great as relatively illustrated in the drawings, and as a matter of personal practice I have found that vanes of the approximate dimensions of two and one-quarter inches deep and one and three-quarter inches wide will function very satisfactorily with average fairly large headlights.

It may also be stated that the vanes do not in fact actually reduce the normal illumination from the headlights to which they are applied, nor do they cause the throwing of shadows or spots on the road ahead, and this is the more so true where their rear faces are highly polished surfaces, cooperating with the main or parabola reflector, and where the outer corners of the vanes are beveled off as illustrated, which seems to permit the reflected light to escape more completely therearound.

Although I have thus fully set forth the improvements in accordance with my present preferences, it nevertheless will be understood that I do not wish to unnecessarily confine myself to all details exactly as disclosed, excepting as they may come within the terms or tenor of the ensuing claims, or equivalents thereof, or as fairly interpreted in the light of the specification if necessary.

What I do claim, as new and patentable, is:

1. In a headlight arrangement for vehicles, the combination with a lamp chamber provided with a concave reflector and a lens closing the outer end of said chamber, of an electric light and its socket mounted in said chamber, a collar clamped on said socket provided with a forwardly and upwardly projecting arm, and a vertically disposed vane set at an angle to said arm and adapted to screen the rays from one side only of said lamp.

2. In a headlight arrangement for vehicles, the combination with a lamp chamber provided with a concave reflector and a lens closing the outer end of said chamber, of an electric light and its socket mounted in said chamber, a collar clamped on said socket, provided with a forwardly and upwardly projecting arm, and a vertically disposed vane having its outer corners cut away and its front and rear surface silvered, said vane being set at an angle to said arm and adapted to screen the rays from one side only of said lamp.

3. A light screen attachment for use with electric headlight lamps for vehicles, comprising a collar adapted to be clamped on the electric light socket, an upwardly and forwardly projecting arm secured to said collar, said arm having its free end bent downwards, and a vane adjustably clamped in a vertical position to the downwardly projecting portion of said arm, said vane having its outer corners cut away, and having its front and rear faces silvered.

In testimony whereof, I affix my signature.

CLARK D. TURNER.